United States Patent [19]
Peterson et al.

[11] Patent Number: 6,103,800
[45] Date of Patent: Aug. 15, 2000

[54] WORKABLY CURING ACRYLIC PLASTIC

[75] Inventors: Dale A. Peterson, Loveland; Randall M. Amen, Estes Park, both of Colo.

[73] Assignee: Plast-Aid Corporation, Estes Park, Colo.

[21] Appl. No.: 09/082,820

[22] Filed: May 21, 1998

Related U.S. Application Data

[60] Provisional application No. 60/047,534, May 22, 1997.

[51] Int. Cl.⁷ ...................................................... C08G 5/09
[52] U.S. Cl. .............................................. 524/296; 424/81
[58] Field of Search ................................ 424/81; 524/296

[56] References Cited

U.S. PATENT DOCUMENTS

| | | |
|---|---|---|
| 4,199,864 | 4/1980 | Ashman . |
| 4,480,079 | 10/1984 | Orton et al. . |
| 4,900,546 | 2/1990 | Posey-Dowty et al. . |
| 5,106,614 | 4/1992 | Posey-Dowty et al. . |
| 5,258,420 | 11/1993 | Pose-Dowty et al. . |
| 5,634,792 | 6/1997 | Brisendine . |

*Primary Examiner*—Terressa M. Boykin
*Attorney, Agent, or Firm*—Limbach & Limbach L.L.P.

[57] ABSTRACT

An acrylic liquid monomer and powdered polymer that, when mixed, cures with workable characteristics over its entire polymerizing phase. As the mixtures cures, its consistency continuously transforms from a castable material to a spreadable, glue-like liquid to a paste to a putty to a reformable clay and finally to a hard plastic. The invention's continuous and non-rubbery curing properties make it easy to work and give it a broad spectrum of uses. The invention may be supplied in the form of a kit.

20 Claims, No Drawings

WORKABLY CURING ACRYLIC PLASTIC

RELATED APPLICATION

This application claims the benefit under 35 U.S.C. § 119(e) of U.S. Provisional Application No. 60/047,534 filed May 22, 1997 and is hereby incorporated by reference.

FIELD OF THE INVENTION

This invention relates to acrylic material. In particular, this invention relates to acrylic monomers and polymers that have workable characteristics over their entire polymerizing stage.

BACKGROUND OF THE INVENTION

Acrylic polymers and monomers are well known in the art and their utility as a glue and repair material is well documented.

Although useful, prior art methyl methacrylate monomer and polymers are difficult to manipulate since their rheology starts out too Newtonian for the early liquid phase of the cure and then becomes too elastic later in the cure process to be easy to manipulate.

An example of a Newtonian liquid is water. If one doubles the energy into a pump, one expects to double the flow of water through the pump. This result is characterized as "Newtonian."

There are many liquids that are non-Newtonian. Catsup, for example, becomes more and more fluid the more that it is stirred. When stirring is stopped, however, the catsup becomes almost gel-like.

These (and there are many in the science of rheology) non-Newtonian properties impart useful characteristics to liquids that are not found in water. Substances that give rise to these properties in a liquid are known as theological substances. One example of a rheological substance is limestone which imparts to methyl methacrylate monomer the quality of thixotropy. Thixotropy is a sort of gel-like property that results in a substance fluidizing upon stirring. The end result of this thixotropy is that it keeps powders from settling out when first mixed with liquid. In the catsup example, the ground-up solids in catsup impart the property of thixotropy to catsup. In the absence of this property, catsup would separate like sand and water upon settling.

U.S. Pat. No. 4,480,079 discloses molded plastics produced by in-mold copolymerization of methyl methacrylate with a polyurethane polyacrylate and is hereby incorporated by reference.

U.S. Pat. No. 5,634,792 discloses a dental repair kit which includes upper and lower replacement teeth, a bottle of a methyl methacrylate liquid monomer, a bottle of a methyl methacrylate powdered polymer, and a grinding and filing tool and is hereby incorporated by reference.

U.S. Pat. No. 5,258,420 discloses an acrylic bone cement which includes a combination of a powdered polymer and a liquid monomer where the liquid monomer includes a diagnostic or therapeutic agent and an emulsifying agent and is hereby incorporated by reference.

While useful, none of the prior art acrylic materials provide acrylic materials that have workable characteristics over the entire polymerizing phase.

SUMMARY OF THE INVENTION

In order to meet these needs, the present invention is directed to acrylic materials that have workable characteristics over the entire polymerizing phase.

The present invention is further directed to an acrylic material comprising a liquid component and a powder component wherein the ratio of the powder component to the liquid component is between 1:1 and 4:1. Preferably, the ratio of the powder component to the liquid component is between 2:1 and 3:1. The powder component may include: ethyl acrylate-methyl methacrylate copolymer, polymethyl methacrylate, one or more plasticizers such as diethyl phthalate, benzylbutyl phthalate, dibutyl phthalate and dibenzyl phthalate; one or more fillers such as silica, limestone, talc, alumina trihydrate, mica, vermiculite, glass fiber, attapulgite clay, diatamaceous earth, titanium oxide, fumed silica, aluminum silicate, kaolin and bentonite and one or more free radical generators such as benzoyl peroxide, tert-butyl peroxide and diethyl peroxide.

The liquid component may include: methyl methacrylate monomer, one or more inhibitors selected from the group consisting of hydroquinone, methyl ether hydroquinone; 4-benzyloxy phenol and 3,5-diisopropyl phenolhydroquinone and one or more liquid cure accelerators such as N,N-dimethylparatoluidine; N,N-Dimethyl-meta-toluidine; N,N-Dimethyl-ortho-toluidine and N-ethyl-N-hydroxyethyl-meta-toluidine.

In a preferred embodiment of the invention, the powder component includes by weight of the powder: 50–70% ethyl acrylate-methyl methacrylate copolymer; 20–40% poly methyl methacrylate; 0.3–8% diethyl phthalate; 2–9% limestone or silica and 0.2–5% benzoyl peroxide. In this preferred embodiment, the liquid component includes by weight of the liquid: 90–99.8% methyl methacrylate monomer; 0% to 10% water or methyl alcohol; 20–100 parts per million hydroquinone or methyl ether hydroquinone and 0.2–1.0% N,N-dimethylparatoluidine.

The acrylic material of the invention may further include one or more coloring agents and one or more filling agents. Coloring agents may be added to the powder or to the liquid or both prior to mixing the liquid and powder together. Coloring agents may also be added while mixing the liquid and powder together. In a preferred embodiment, the filling agent is limestone or silica. Preferably, the limestone or silica is present in the powder at a ratio of 2–9% by weight of the powder. Limestone and/or silica is added as a filler but it also effects the rheology of the curing mixture by imparting the quality of thixotropy which keeps the powders from settling out when mixed with the liquid.

The present invention is further directed to a kit for creating a workably curing acrylic plastic material comprising: a) an acrylic liquid monomer component, wherein the liquid monomer includes: methyl methacrylate monomer; a cure accelerator such as one or more cure accelerators selected from the group consisting of N,N-Dimethylparatoluidine; N,N-Dimethyl-meta-toluidine; N,N-Dimethyl-ortho-toluidine and N-ethyl-N-hydroxyethyl-meta-toluidine and one or more inhibitors selected from the group consisting of hydroquinone, methyl ether hydroquinone; 4-benzyloxy phenol and 3,5-diisopropyl phenolhydroquinone; and b) a powdered polymer component, wherein the powdered polymer includes: ethyl acrylate-methyl methacrylate copolymer, polymethyl methacrylate, one or more plasticisers selected from the group consisting of diethyl phthalate; benzylbutyl phthalate; dibutyl phthalate and dibenzyl phthalate; and one or more fillers selected from the group consisting of silica, limestone, talc, alumina trihydrate, mica, vermiculite, glass fiber, attapulgite clay, diatamaceous earth, titanium oxide, fumed silica, aluminum silicate, kaolin and bentonite; and a free radical generator selected from the group consisting of benzoyl peroxide, tert-butyl peroxide and diethyl peroxide.

In a preferred embodiment of the kit of the invention, the powder component of the acrylic material may include by weight of the powder: 50–70% ethyl acrylate-methyl methacrylate copolymer; 20–40% polymethyl methacrylate; 0.3–8% diethyl phthalate; 2–9% limestone or silica and 0.2–5% benzoyl peroxide. In this preferred embodiment, the liquid component may include by weight of the liquid: 90–99.8% methyl methacrylate monomer; 0% to 10% water or methyl alcohol; 20–100 parts per million hydroquinone, methyl ether hydroquinone or other inhibitor and 0.2–1.0% N,N-dimethylparatoluidine.

The kit of the invention may further include one or more coloring agents and one or more filling agents. In one embodiment of the kit, the filling agent is limestone or silica. Preferably, the limestone is present in the powder at a ratio of 2–9% by weight of the powder.

The present invention is further directed to a method of repairing material, the method comprising several steps. The articles for repair comprise any hard, rough or rigid material including but not limited to wood, plastic, metal, stone, and mixtures thereof. The plastic material is generally selected from the group consisting of polyvinyl chloride, chlorinated polyvinyl chloride, acrylonitrile-butadiene-styrene, polycarbonate copolymer, styrene, acrylic or any plastic upon which methyl methacrylate acts as a solvent, and mixtures thereof.

In a first step of the method of repairing material of the invention, an acrylic liquid is mixed with an acrylic powder in a ratio between approximately one part of the liquid to four parts of the powder, to one part of the liquid to one part of the powder, thereby forming a curable acrylic plastic mixture. In the method, the liquid may include: methyl methacrylate monomer; one or more cure accelerators selected from the group consisting of N,N-Dimethylparatoluidine; N,N-Dimethyl-meta-toluidine; N,N-Dimethyl-ortho-toluidine and N-ethyl-N-hydroxyethyl-meta-toluidine, and one or more inhibitors selected from the group consisting of hydroquinone, methyl ether hydroquinone; 4-benzyloxy phenol and 3,5-diisopropyl phenolhydroquinone. In the method, the powder may include: ethyl acrylate-methyl methacrylate copolymer; polymethyl methacrylate, one or more plasticizers selected from the group consisting of diethyl phthalate; benzylbutyl phthalate; dibutyl phthalate and dibenzyl phthalate; one or more fillers selected from the group consisting of silica, limestone, talc, alumina trihydrate, mica, vermiculite, glass fiber, attapulgite clay, diatamaceous earth, titanium oxide, fumed silica, aluminum silicate, kaolin and bentonite; and a free radical generator selected from the group consisting of benzoyl peroxide, tert-butyl peroxide and diethyl peroxide.

In a second step of the method of repairing material, the acrylic plastic combination is allowed to mix to form a curing acrylic mixture. In another step of the method of repairing material, the curing acrylic mixture is applied to the article.

In a preferred embodiment of the method of repairing material of the invention, the liquid monomer includes by weight of the liquid: 90.0% to 99.8% of methyl methacrylate monomer; 0% to 10% water or methyl alcohol; 0.2% to 1.0% of N,N-dimethylparatoluidine and 20 to 100 parts per million of hydroquinone, methyl ether hydroquinone or other inhibitors. In this preferred embodiment, the powdered polymer comprises by weight of the powder 50% to 70% of ethyl acrylate-methyl methacrylate copolymer; 20% to 40% of polymethyl methacrylate; 0.3% to 8% diethyl phthalate; 2–9% limestone or silica and 0.2% to 5% benzoyl peroxide.

The invention is further directed to a multi-step method for anchoring a first article to a second article. The first and second articles may comprise any hard, rough, rigid materials including but not limited to wood, plastic, metal, stone, and mixtures thereof.

In a first step of the method of the invention for anchoring a first article to a second article, an acrylic liquid monomer is mixed with a powdered polymer in a ratio between approximately one part liquid to four parts powder to one part liquid to one part powder, thereby forming a curing acrylic plastic mixture. In a preferred embodiment of the method, the liquid monomer may include: methyl methacrylate monomer, one or more liquid cure accelerators selected from the group consisting of N,N-Dimethylparatoluidine; N,N-Dimethyl-meta-toluidine; N,N-Dimethyl-ortho-toluidine and N-ethyl-N-hydroxyethyl-meta-toluidine and one or more inhibitors selected from the group consisting of hydroquinone, methyl ether hydroquinone; 4-benzyloxy phenol and 3,5-diisopropyl phenolhydroquinone. In this preferred embodiment, the powdered polymer includes: ethyl acrylate-methyl methacrylate copolymer; polymethyl methacrylate; one or more plasticizers selected from the group consisting of diethyl phthalate; benzylbutyl phthalate; dibutyl phthalate and dibenzyl phthalate; one or more fillers selected from the group consisting of silica, limestone, talc, alumina trihydrate, mica, vermiculite, glass fiber, attapulgite clay, diatamaceous earth, titanium oxide, fumed silica, aluminum silicate, kaolin and bentonite; and a free radical generator selected from the group consisting of benzoyl peroxide, tert-butyl peroxide and diethyl peroxide.

In another step of the method for anchoring a first article to a second article, the acrylic plastic mixture is applied to the first article. In another step, the second article is applied to the acrylic plastic mixture on the first article thereby anchoring the first article to the second article.

In a preferred embodiment of the method for anchoring a first article to a second article of the invention, the liquid monomer includes by weight of the liquid: 90.0% to 99.8% of methyl methacrylate monomer; 0% to 10% water or methyl alcohol; 0.2% to 1.0% of N,N-dimethylparatoluidine and 20 to 100 parts per million of hydroquinone or methyl ether hydroquinone. In this preferred embodiment, the powdered polymer includes by weight of the powder: 50% to 70% ethyl acrylate-methyl methacrylate copolymer; 20% to 40% polymethyl methacrylate; 0.3% to 8% diethyl phthalate; 2–9% limestone or silica and 0.2% to 5% benzoyl peroxide.

DETAILED DESCRIPTION OF THE INVENTION

DEFINITIONS

To ensure a complete understanding of the invention the following definitions are provided:

Workably Curing Acrylic Material: A workably curing acrylic material according to the invention is an acrylic material that is workable or useable during the entire cure phase. As the material cures, its consistency continuously transforms from a castable material, to a spreadable glue-like liquid to a paste to a putty to a reformable clay and finally to a hard plastic.

Acrylic Cure Phase: An acrylic cure phase is the transition period during which acrylic material according to the invention polymerizes and hardens to a hard plastic.

Inhibitor: Inhibitors are added to acrylic materials to minimize polymerization during storage and include hydroquinone, and various functional equivalents such as methyl ether hydroquinone; 4-benzyloxy phenol and 3,5-diisopropyl phenol.

Coloring Agents: Coloring agents are materials that add color to the acrylic materials of the invention and include dyes, wood stains, artist acrylics and paint pigments.

Fillers: Fillers are additives to the acrylic material which alter the mechanical properties or Newtonian characteristics of the acrylic material. Such fillers include silica, calcium carbonate (limestone), talc, alumina trihydrate, mica, various clays, vermiculite, glass fiber, attapulgite clay, diatamaceous earth, titanium oxide, fumed silica, aluminum silicate, kaolin and bentonite.

Plasticizer: Plasticizers are organic compounds added to polymers both to facilitate processing and to increase the flexibility and toughness of the final product by salvation of the polymer molecule. Plasticizers include phthalates such as diethyl phthalate; benzylbutyl phthalate; dibutyl phthalate and dibenzyl phthalate.

Coupling Agents: Coupling agents are used to link the filler to the polymer matrix and include such agents as γ-methacryloxypropyltrimethoxysilane.

Tubing: Tubing includes tubing used in household and industrial plumbing, automobiles, trucks, boats and aircrafts. Such tubing can be made of wood, metal, plastic and glass. The material of the invention chemically bonds to plastic tubing made of polycarbonate, polyvinyl chloride (PVC), chlorinated polyvinyl chloride (CPVC), acrylonitrile-butadiene-styrene copolymer (ABS), styrene, acrylic materials and any blend thereof that dissolves in the presence of methyl methacrylate monomer.

Liquid Cure Accelerator: Liquid cure accelerators are amine liquid cure accelerators used to promote free radical generation from organic peroxide initiators in addition polymerizations. The free radicals are generated at below room temperature by chemical reduction of the peroxide. Cure accelerators include N,N-Dimethylparatoluidine and functional equivalents such as N,N-Dimethyl-meta-toluidine; N,N-Dimethyl-ortho-toluidine and N-ethyl-N-hydroxyethyl-meta-toluidine.

Free Radical Generators: Free radical generators are substances that decompose to form free radicals that begin the process of polymerization in addition reactions. Free radical generators include benzoyl peroxide, tert-butyl peroxide and diethyl peroxide.

Articles For Repair: Articles for repair are materials and items which can be repaired, fixed, or otherwise augmented with the acrylic material of the invention. Such materials and items can be made of materials including but not limited to wood, plastic, metal, stone, CPVC, PVC, polycarbonate, ABS, styrene and mixtures thereof. The materials and items that can be repaired include cracks, surface imperfections, and holes, in any hard, rigid materials.

Dental Acrylic: Dental Acrylic is a material used to make dentures and includes two components: 1) A liquid consisting of methyl methacrylate monomer, hydroquinone and N,N-dimethylparatoluidine and 2) a powder consisting of methyl methacrylate powdered polymer, diethyl phthalate, and benzoyl peroxide. These two components are mixed to result in dental acrylic.

Tray Acrylic: Tray Acrylic is a material used to make trays utilized to form denture molds used for casting teeth and includes two components: 1) A liquid and 2) a powder consisting of components such as ethyl acrylate-methyl methacrylate copolymer; polymethyl methacrylate; limestone; diethyl phthalate and benzoyl peroxide.

Taking into account these definitions, the present invention is directed to a workably curing acrylic material. The materials of the invention involve the blending of dental acrylic and tray acrylic powders in specific ratios to produce an acrylic material with workable cure characteristics over the entire cure phase when mixed with dental acrylic liquid.

Dental acrylic and tray acrylic are separately useful for production of dentures (dental acrylic) and trays for forming dentures (tray acrylic). However, when combined in the proper ratios, a mixture of dental and tray acrylic powders offers a superior acrylic material that has workable cure characteristics over its entire cure phase when mixed with dental acrylic liquid.

Dental acrylic and tray acrylic are generally provided commercially as powder/liquid kits. When combined together, tray acrylic powder acts as a modifier for powdered dental acrylic. The dental and tray acrylic powders are combined in mixtures between 1 part tray acrylic to 10 parts dental acrylic powder to 1 part tray acrylic to 1 part dental acrylic powder. Preferably, the acrylic materials of the invention are combined in mixtures between from 1 part tray acrylic to 4 parts dental acrylic powder. Most preferably, the acrylic materials of the invention are combined in mixtures between 1 part tray acrylic to 3 parts dental acrylic powder.

The acrylic material of the invention is generally supplied to the user in two parts, a liquid and a powder, preferably in the form of a kit. The user mixes approximately 1 part dental acrylic liquid monomer to 2 parts of a tray/dental acrylic powder blend in a suitable mixing cup. Generally, the mixture polymerizes to a hard acrylic plastic in about 10 to 15 minutes at room temperature. If the user wants the acrylic material to flow like glue, more liquid monomer is added. If the user wants the acrylic material to be more like the consistency of clay, less liquid is added. While it cures, the consistency of the acrylic material continuously changes from a liquid to a paste to a putty to a clay to a hard plastic. The cure is exothermic. The acrylic material is smooth and spreadable during its early to middle curing stages and non-rubbery and formable like clay during its final curing stage. The acrylic material begins to set and becomes non-workable only at the very last part of its cure, just as it hardens.

Coloring agents and fillers may be added at any point prior to or during mixing to vary the color and/or the consistency of the mixture.

The user applies the acrylic material of the invention when its consistency suits his use. For example, when the invention is a liquid, it may be poured into a mold for casting an acrylic plastic piece or into a hole in concrete for anchoring bolts. The invention may also be used for adhesive bonding. When the acrylic material of the invention is clay-like, it may be formed and sculpted into various shapes. The acrylic material of the invention can be formed around a lightly oiled bolt to form a knob with internal threads. The oil prevents the acrylic material of the invention from sticking to the bolt.

When fully cured, the acrylic material of the invention may be sanded, carved, buffed, sawed, polished and painted.

The acrylic material of the invention chemically bonds to many plastics including polycarbonate, PVC, CPVC, ABS, styrene, acrylic materials and any plastic dissolved by methyl methacrylate. The acrylic material of the invention also mechanically bonds to wood, metal, stone or any hard, rough or rigid substance.

In order to determine if the acrylic material of the invention will chemically bond to a specific plastic material, a small amount of liquid monomer can be applied to the material of interest. The acrylic material of the invention will chemically bond to the material of interest if the liquid material dissolves and/or solubilizes part of the material of interest. This is solvent bonding where the solvent becomes a plastic.

The invention will be better understood by reference to the following non-limiting Examples.

EXAMPLE 1

Preparation of Dental Acrylic Powder

Dental acrylic powder is formed by mixing at room temperature the following by weight:

| | |
|---|---|
| Polymethyl methacrylate (CAS 9011-14-7) | 40% |
| Methyl methacrylate/ethyl acrylate copolymer (CAS 9010-88-2) | 55% |
| Benzoyl Peroxide (CAS 94-36-0) | 2% |
| Diethyl phthalate (CAS 84-66-2) | 3% |

EXAMPLE 2

Preparation of Dental Acrylic Liquid

Dental acrylic liquid is formed by mixing at room temperature the following by volume:

| | |
|---|---|
| Methyl methacrylate monomer (CAS No. 80-62-6) | 99.4% |
| Hydroquinone (CAS No. 123-31-9) | 25 PPM |
| N,N-Dimethylparatoluidine (CAS No. 99-97-8) | 0.6% |

EXAMPLE 3

Preparation of Dental Acrylic

Dental acrylic is formed by combining one part liquid from example 2 with two to three parts powder from Example 1.

EXAMPLE 4

Preparation of Tray Acrylic Powder

Tray acrylic powder is formed by mixing at room temperature the following by weight:

| | |
|---|---|
| Ethyl acrylate-methyl methacrylate copolymer (CAS 9010-88-2) | 50–70%. |
| Limestone (CAS 1317-65-3) | 24%. |
| Diethyl phthalate (CAS 84-66-2) | 0.9%. |
| Benzoyl peroxide (CAS 94-36-0) | 0.6%. |

EXAMPLE 5

Preparation of Tray Acrylic

Tray acrylic is formed by combining 2 to 3 parts tray acrylic powder from Example 4 with 1 part acrylic liquid such as that in Example 2.

EXAMPLE 6

Preparation of a Workably Curing Acrylic Material Powder

75% Dental acrylic powder from Example 1 and 25% Tray acrylic powder from Example 4 are combined at room temperature to form a powder mix.

Powder Mix Summary of Composition

| | Powder Mix | Useful Range |
|---|---|---|
| Limestone/Silica | 6% | 2–9% |
| Benzoyl Peroxide | 1.7% | 0.2–5% |
| Diethyl Phthalate | 2.5% | 0.3–8% |
| CAS No. 9010-88-2[a] | 59.8% | 50–70% |
| CAS No. 9011-14-7[b] | 30% | 20–40% |
| Coloring Agent | optional | optional |

[a]Ethyl acrylate-methyl methacrylate copolymer
[b]Polymethyl methacrylate

Liquid

| | Liquid % | Useful Range |
|---|---|---|
| Methyl Methacrylate Monomer (CAS 80-62-6) | 99.4% | 90–99.8%* |
| Hydroquinone (CAS 123-31-9) | 25 PPM | 20–100 PPM |
| N,N-Dimethylparatoluidine(CAS 99-97-8) | 0.6% | 0.2–1.0% |
| Coloring agent | optional | optional |

*water or methyl alcohol may pollute the liquid without effecting the effectiveness of the acrylic material.

Two parts powder mix are mixed with one part liquid and the resulting reaction passes through a very useful curing phase.

The liquids and powder were blended in various combinations between 10% liquid and 90% powder to 50% liquid and 50% powder. The acrylic material was most workable in the range of 15% to 45% liquid with the optimum range being 20–33% liquid with 80 to 67% powder. Outside the optimum ranges, the acrylic material was difficult to work with and did not exhibit the desired properties of being workable over the entire cure phase.

EXAMPLE 7

Preparation of an Acrylic Kit

An acrylic kit may be prepared by placing containers of powder mix and liquid acrylic prepared as in Examples 6 in a common package. The kit may include a mixing device as well as a measuring device. The kit may also include various fillers and coloring agents to add to the acrylic material during the mixing of acrylic materials. The kit can also include directions for utilizing the kit components.

EXAMPLE 8

Repair of Materials

The workably curing acrylic material of Example 6 is mixed and allowed to cure to a desired working consistency. Once prepared, the material can be utilized to repair holes, patch openings, connect separated materials and the like.

The acrylic material of Example 6 bonds to and will repair to the following materials: wood, metal, stone or other hard, roughened or rigid materials, polycarbonate, PVC, CPVC, styrene, acrylic and mixtures thereof.

The acrylic material of Example 6 will not chemically bond to the following materials: Formica®, Delrin®, nylon, polyethylene, polypropylene and other polyolefins.

However, the acrylic material of Example 6 will mechanically bond to these materials.

EXAMPLE 9

Acrylic Materials as an Adhesive

The acrylic material of Example 6 finds use as a strong adhesive material. When mixed in the appropriate ratios set forth in Example 6, the acrylic material bonds to the following materials: wood, metal, stone or other hard, roughened or rigid materials, polycarbonate, PVC, CPVC, styrene, acrylic and mixtures thereof.

The acrylic material of Example 6 will not chemically bond to the following materials: Formica®, Delrin®, nylon, polyethylene, polypropylene and other polyolefins. However, the acrylic material of Example 6 will mechanically bond to these materials.

In prior art methods, PVC-type tubing is swabbed with a solvent such as tetrahydrofuran in order for a first tube to be connected to a second tube. Tetrahydrofuran is utilized as a solvent and may be thickened by dissolving PVC into it. In this method, the tetrahydrofuran solvent is undesirably released to the atmosphere. Pipes treated in this fashion require a considerable amount of time to be bonded together.

In contrast, application of the acrylic material of Example 6 does not require tetrahydrofuran. Methyl methacrylate monomer is a solvent for PVC but because it polymerizes during the curing process as the solvent becomes plastic it does not escape the glue joint like tetrahydrofuran. In addition, solvent based adhesives are generally individually formulated specifically for PVC or ABS or Acrylic or polycarbonate, etc. The material of this invention is not only successful in bonding all of these plastics but will also bond them to each other. The key to this success is that the solvent becomes plastic.

In the method of this invention, the acrylic material of Example 6 is initially swabbed on a first tube. A second tube is then placed adjacent to the first tube and in contact with the area of swabbing of the acrylic material. The first and second tube may be held in place with a clamp. A strong bond is formed in about 10 to 15 minutes.

We claim:

1. An acrylic material comprising a liquid component and a powder component wherein the ratio of said powder component to said liquid component is between 1:1 and 4:1, wherein:

said powder component includes:
  ethyl acrylate-methyl methacrylate copolymer;
  polymethyl methacrylate;
  one or more plasticizers selected from the group consisting of diethyl phthalate; benzylbutyl phthalate; dibutyl phthalate and dibenzyl phthalate;
  one or more fillers selected from the group consisting of silica, limestone, talc, alumina trihydrate, mica, vermiculite, glass fiber, attapulgite clay, diatamaceous earth, titanium oxide, fumed silica, aluminum silicate, kaolin and bentonite; and
  a free radical generator selected from the group consisting of benzoyl peroxide, tert-butyl peroxide and diethyl peroxide; and said liquid component includes:
  methyl methacrylate monomer;
  one or more inhibitors selected from the group consisting of hydroquinone, methyl ether hydroquinone; 4-benzyloxy phenol and 3,5-diisopropyl phenolhydroquinone; and
  one or more cure accelerators selected from the group consisting of N,N-Dimethylparatoluidine; N,N-Dimethyl-meta-toluidine; N,N-Dimethyl-ortho-toluidine and N-ethyl-N-hydroxyethyl-meta-toluidine.

2. The acrylic material of claim 1, wherein said powder component includes by weight of said powder:
  50–70% ethyl acrylate-methyl methacrylate copolymer;
  20–40% polymethyl methacrylate;
  0.3–8% diethyl phthalate;
  2–9% limestone or silica or mixtures thereof and
  0.2–5% benzoyl peroxide; and
said liquid component includes by weight of said liquid:
  90–99.8% methyl methacrylate monomer;
  0–10% water or methyl alcohol;
  20–100 parts per million hydroquinone or methyl ether hydroquinone; and
  0.2–1.0% N,N-dimethylparatoluidine.

3. The acrylic material of claim 1 wherein the ratio of said powder component to said liquid component is between 1:1 and 3:1.

4. The acrylic material of claim 1 further including one or more coloring agents.

5. The acrylic material of claim 1 further wherein said filler is limestone or silica or mixtures thereof.

6. The acrylic material of claim 5 wherein said limestone or silica is present in said powder at a ratio of 3–9% by weight of said powder.

7. The acrylic material of claim 5 wherein the limestone or silica is present in said powder at a ratio of 5–7% by weight of said powder.

8. A kit for creating an acrylic plastic material, comprising:
  a) an acrylic liquid monomer component wherein the liquid monomer includes:
    methyl methacrylate monomer;
    one or more cure accelerators selected from the group consisting of N,N-Dimethylparatoluidine; N,N-Dimethyl-meta-toluidine; N,N-Dimethyl-ortho-toluidine and N-ethyl-N-hydroxyethyl-meta-toluidine; and
    one or more inhibitors selected from the group consisting of hydroquinone, methyl ether hydroquinone; 4-benzyloxy phenol and 3,5-diisopropyl phenolhydroquinone;
  b) a powered polymer component, wherein the powdered polymer includes:
    ethyl acrylate-methyl methacrylate copolymer;
    polymethyl methacrylate;
    one or more plasticizers selected from the group consisting of diethyl phthalate; benzylbutyl phthalate; dibutyl phthalate and dibenzyl phthalate;
    one or more fillers selected from the group consisting of silica, limestone, talc, alumina trihydrate, mica, vermiculite, glass fiber, attapulgite clay, diatamaceous earth, titanium oxide, fumed silica, aluminum silicate, kaolin and bentonite; and
    a free radical generator selected from the group consisting of benzoyl peroxide, tert-butyl peroxide and diethyl peroxide.

9. A kit according to claim 8, comprising:
  a) an acrylic liquid monomer component, wherein the liquid monomer includes by weight of said liquid:
    90.0% to 99.8% methyl methacrylate monomer;
    0% to 10% water or methyl alcohol;

0.2% to 1.0% of N,N-dimethylparatoluidine; and 20 to 100 parts per million hydroquinone or methyl ether hydroquinone; and b) a powdered polymer component, wherein the powdered polymer includes by weight of said powder:

50% to 70% of ethyl acrylate-methyl methacrylate copolymer;

20% to 40% of polymethyl methacrylate;

0.3% to 8% diethyl phthalate;

2 to 9% limestone or silica and 0.2% to 5% benzoyl peroxide.

10. The kit according to claim 9 wherein said powdered polymer further includes one or more coloring agents.

11. The kit according to claim 9 wherein said powdered polymer further includes one or more filling agents.

12. The kit according to claim 9 wherein said filling agent is limestone or silica wherein limestone or silica is present at 5 to 7% by weight of said powder.

13. A method of repairing material, the method comprising the steps of:

a) mixing an acrylic liquid with an acrylic powder in a ratio between approximately one part of the liquid to four parts of the powder, to one part of the liquid to one part of the powder, thereby forming a curable acrylic plastic mixture, wherein the liquid includes:

methyl methacrylate monomer;

one or more cure accelerators selected from the group consisting of N,N-Dimethylparatoluidine; N,N-Dimethyl-meta-toluidine; N,N-Dimethyl-ortho-toluidine and N-ethyl-N-hydroxyethyl-meta-toluidine; and one or more inhibitors selected from the group consisting of hydroquinone, methyl ether hydroquinone; 4-benzyloxy phenol and 3,5-diisopropyl phenolhydroquinone;

and wherein the powder includes:

ethyl acrylate-methyl methacrylate copolymer;

polymethyl methacrylate;

one or more plasticizers selected from the group consisting of diethyl phthalate; benzylbutyl phthalate; dibutyl phthalate and dibenzyl phthalate;

one or more fillers selected from the group consisting of silica, limestone, talc, alumina trihydrate, mica, vermiculite, glass fiber, attapulgite clay, diatamaceous earth, titanium oxide, fumed silica, aluminum silicate, kaolin and bentonite; and a free radical generator selected from the group consisting of benzoyl peroxide, tert-butyl peroxide and diethyl peroxide;

b) applying said curing acrylic mixture to said article to repair said article.

14. The method of claim 13, wherein the liquid monomer includes by weight of said liquid:

90.0% to 99.8% of methyl methacrylate monomer;

0% to 10% water or methyl alcohol;

0.2% to 1.0% of N,N-dimethylparatoluidine; and 20 to 100 parts per million of hydroquinone or methyl ether hydroquinone;

and wherein the powdered polymer comprises by weight of said powder

50% to 70% of ethyl acrylate-methyl methacrylate copolymer;

20% to 40% of polymethyl methacrylate;

0.3% to 8% diethyl phthalate;

2% to 9% limestone or silica and 0.2% to 5% benzoyl peroxide.

15. The method of claim 13 wherein said article comprises material selected from the group consisting of wood, plastic, metal, stone and mixtures thereof.

16. The method of claim 15 wherein said plastic material is selected from the group consisting of polyvinyl chloride, CPVC, acrylonitrile-butadiene-styrene copolymer, polycarbonate, acrylic, styrene and mixtures thereof.

17. A method for anchoring a first article to a second article, the method comprising the steps of:

a) mixing an acrylic liquid monomer with a powdered polymer in a ratio between approximately one part liquid to four parts powder to one part liquid to one part powder, thereby forming a curing acrylic plastic mixture, wherein the liquid monomer includes:

methyl methacrylate monomer;

one or more cure accelerators selected from the group consisting of N,N-Dimethylparatoluidine; N,N-Dimethyl-meta-toluidine; N,N-Dimethyl-ortho-toluidine and N-ethyl-N-hydroxyethyl-meta-toluidine; and one or more inhibitors selected from the group consisting of hydroquinone, methyl ether hydroquinone; 4-benzyloxy phenol and 3,5-diisopropyl phenolhydroquinone; and wherein the powdered polymer includes:

ethyl acrylate-methyl methacrylate copolymer;

polymethyl methacrylate;

one or more plasticizers selected from the group consisting of diethyl phthalate; benzylbutyl phthalate; dibutyl phthalate and dibenzyl phthalate;

one or more fillers selected from the group consisting of silica, limestone, talc, alumina trihydrate, mica, vermiculite, glass fiber, attapulgite clay, diatamaceous earth, titanium oxide, fumed silica, aluminum silicate, kaolin and bentonite; and a free radical generator selected from the group consisting of benzoyl peroxide, tert-butyl peroxide and diethyl peroxide.

b) applying said acrylic plastic mixture to said first article; and c) contacting said second article to said acrylic plastic mixture on said first article thereby anchoring said first article to said second article.

18. The method of claim 17, wherein the liquid monomer includes by weight of said liquid:

90.0% to 99.8% of methyl methacrylate monomer;

0% to 10% water or methyl alcohol;

0.2% to 1.0% of N,N-dimethylparatoluidine; and

20% to 100 parts per million of hydroquinone or methyl ether hydroquinone; and wherein the powdered polymer includes by weight of said powder:

50% to 70% ethyl acrylate-methyl methacrylate copolymer;

20% to 40% polymethyl methacrylate;

0.3% to 8% diethyl phthalate;

2% to 9% limestone or silica and 0.2% to 5% benzoyl peroxide.

19. The method of claim 17 wherein said first and second articles comprise materials selected from the group consisting of wood, plastic, metal, stone, and mixtures thereof.

20. The method of claim 17 wherein the ratio of liquid and powder polymer is one part liquid to two parts powder.

* * * * *